United States Patent [19]

Satoh

[11] Patent Number: 5,160,671
[45] Date of Patent: Nov. 3, 1992

[54] METHOD FOR REGENERATING MANDREL MADE OF THERMALLY EXPANDABLE FLUORORESIN

[75] Inventor: Hajime Satoh, Hiratsuka, Japan

[73] Assignee: The Yokohama Rubber Co., Ltd., Tokyo, Japan

[21] Appl. No.: 777,047

[22] Filed: Oct. 16, 1991

[30] Foreign Application Priority Data

Nov. 9, 1990 [JP] Japan .................. 2-302612

[51] Int. Cl.$^5$ .............................. B29C 61/04
[52] U.S. Cl. ........................ 264/36; 264/39; 264/230; 264/235; 264/257; 264/313; 264/337; 264/342 R; 264/346; 425/393; 425/403
[58] Field of Search ............ 264/345, 346, 342 R, 264/235, 39, 36, 230, 313, 337, 257; 425/403, 403.1, 393

[56] References Cited

U.S. PATENT DOCUMENTS

| | | | |
|---|---|---|---|
| 2,794,481 | 6/1957 | Anderson | 425/403 |
| 2,808,622 | 10/1957 | Stott et al. | 264/235 |
| 2,886,853 | 5/1959 | Herman et al. | 264/337 |
| 3,061,873 | 11/1962 | Supitilov | 264/313 |
| 3,076,233 | 2/1963 | Taylor | 264/346 |
| 3,165,569 | 1/1965 | Bright | 264/313 |
| 3,656,233 | 4/1972 | Overholser | 264/346 |
| 3,962,394 | 6/1976 | Hall | 264/337 |
| 4,683,099 | 7/1987 | Buxton et al. | 264/337 |

*Primary Examiner*—Jeffery Thurlow
*Attorney, Agent, or Firm*—Nikaido, Marmelstein, Murray & Oram

[57] ABSTRACT

A method for regenerating a used mandrel made of a fluororesin, includes the steps of heating the mandrel under substantially unloaded conditions to a temperature above the temperature at which the fluororesin is crystallized and gradually cooling the mandrel to a temperature below the temperature at which the fluororesin is crystallized.

8 Claims, 1 Drawing Sheet

METHOD FOR REGENERATING MANDREL MADE OF THERMALLY EXPANDABLE FLUORORESIN

BACKGROUND OF THE INVENTION

The present invention relates to a method for regenerating a mandrel made of a thermally expandable fluororesin. More particularly, the present invention is concerned with a method for regenerating a mandrel made of a thermally expandable fluororesin which has been used in hollow molding of fiber reinforced plastics (hereinafter referred to as "FRP") comprising a thermoplastic resin as a matrix.

One of the processes for molding a hollow FRP product comprises placing a hollow preform made of an FRP molding material in an outer die, inserting a thermally expandable mandrel into the hollow part of the preform, heating the whole to cause thermal expansion of the mandrel, thereby clamping the preform between the mandrel and the outer die, rapidly cooling the whole to solidify the preform thus treated and shrink the mandrel, withdrawing the shrunk mandrel.

The thermally expandable mandrel for use in this process is required to be excellent not only in the capability of thermal expansion but also in the property of sufficiently clamping the preform of an FRP molding material while retaining the elasticity in the above-described heating-cooling cycle (hereinafter referred to as the elasticity retentiveness) and the property of retaining the similitude of the shape during the expansion-shrinkage cycle in accordance with the heating-cooling cycle (hereinafter referred to as the shape retentiveness).

A fluororesin such as polytetrafluoroethylene resin has hitherto been employed as the raw material of the thermally expandable mandrel. However, the mandrel made of a fluororesin has had a drawback that it suffers from a phenomenon known as the stress relaxation or creep when heated under highly deformed conditions for a prolonged period of time to lower the elasticity retentiveness in the heating step, thereby failing in sufficiently clamping the preform of an FRP molding material inside the outer die and giving the molded product various defects such as deformation, voids and delamination. Further, there has been a problem such that the rapid cooling from the heated state causes even the mandrel which has undergone elastic deformation to have been cooled before it can regain its initial shape, thereby lowering the shape retentiveness. Therefore, the mandrel made of a fluororesin can be reused at most twice or thrice and a further reuse thereof has been almost impossible.

SUMMARY OF THE INVENTION

An object of the present invention is to provide a method for regenerating a mandrel made of a fluororesin, by which the mandrel can maintain its initial elasticity and shape retentiveness even after being repeatedly used, so that the frequency of its reuse can be remarkably increased.

The present invention for attaining the above-described object is characterized by comprising the steps of heating a used mandrel made of a fluororesin under substantially unloaded conditions to a temperature above the temperature at which the fluororesin is crystallized and gradually cooling the mandrel to a temperature below the temperature at which the fluororesin is crystallized.

The heating of a used mandrel made of a fluororesin under substantially unloaded conditions to a temperature above the temperature at which the fluororesin is crystallized serves to remove deformation. Further, the gradual cooling from the heated state to a temperature below the temperature at which the fluororesin is crystallized serves to uniformly cool the whole of the mandrel without causing temperature distribution to thereby allow the mandrel to regain its initial shape while retaining the similitude of the shape and promote crystal growth for conversion from the amorphous form into the crystalline form, so that it is possible for the mandrel to recover a highly elastic state. That is, it is possible to remarkably increase the frequency of the reuse of the mandrel while maintaining the initial elasticity and shape retentiveness.

DETAILED DESCRIPTION OF THE PREFERRED EMBODIMENTS

Figure 1:
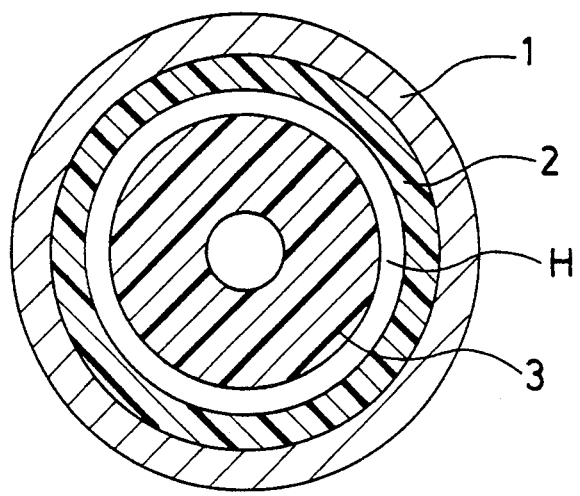
FIG. 1 is a cross-sectional view of an assembly, before heating, for molding a hollow FRP product using a thermally expandable mandrel.
Figure 2:
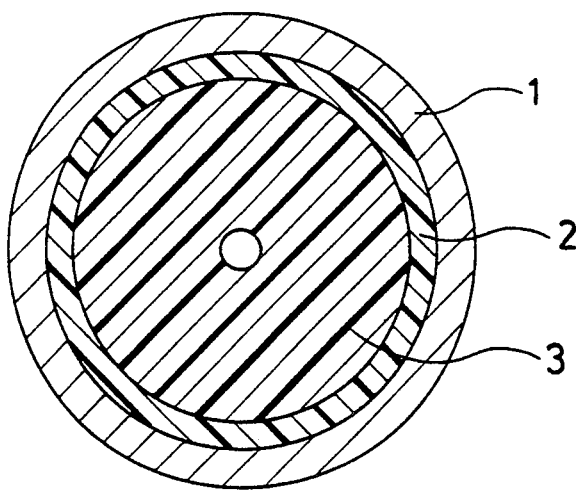
FIG. 2 is a cross-sectional view of the same assembly after heating.

The mandrel made of a fluororesin to be regenerated in the present invention is one to be used in the molding of a hollow FRP product as follows. First, as illustrated in FIG. 1, a preform 2 obtained by previously molding an FRP molding material into a hollow form is placed in an outer die 1 and a mandrel 3 made of a fluororesin is inserted into the hollow part H of the preform 2. Subsequently, the whole is placed in an oven and heated to thereby soften and melt the preform 2 and simultaneously expand the mandrel 3. As a result, the preform 2 is clamped and molded between the outer die 1 and the mandrel 3, as illustrated in FIG. 2. Thereafter, the whole is rapidly cooled to thereby solidify the preform 2 and simultaneously shrink the mandrel 3. The shrunk mandrel 3 is withdrawn and the preform 2 which has been clamped and molded is taken out as a hollow FRP product.

The mandrel made of a fluororesin undergoes lowering in the elasticity and shape retentiveness by the repeated use in the above-described process for molding a hollow FRP product. The present invention enables the mandrel made of a fluoro-resin which has undergone such function lowering to recover its function by treating the mandrel, each time after the use in the molding, according to the method for its regeneration which will be described below in detail.

The fluororesin to be used for forming the mandrel to be regenerated in the present invention is one having a high thermal expansibility. Representative examples thereof include polytetrafluoroethylene (hereinafter referred to as PTFE), hexafluoropropylenetetrafluoroethylene copolymer and polychlorotrifluoroethylene. Of these, polytetrafluoroethylene, the volume of which is expanded as much as 50 to 60% by heating, is most desirable.

The outer shape of the mandrel is defined by the shape of the hollow part of the molded product, while the inner shape of the mandrel may be either solid or hollow. It is preferred that the mandrel per se be in the cylindrical form having a hollow part at its core.

In order to regenerate a used mandrel made of a fluororesin according to the present invention, first, the mandrel is subjected to the step of heating under substantially unloaded conditions to a temperature above the temperature at which the fluororesin is crystallized. It is preferred that the upper limit of the heating temperature be below the temperature at which the fluororesin necessary to retain the shape of the mandrel begins to flow. Most desirably, the mandrel is heated at about the temperature at which the mandrel is actually heated in the molding of a hollow product. Regarding the heating time, the heating of the mandrel is preferably effected until the whole of the mandrel is at the same temperature as the heating temperature and the deformation can be sufficiently removed.

The term "substantially unloaded conditions" means such conditions that no external force is applied to the mandrel made of a fluororesin and at the same time the load of the mandrel per se is not applied to the molding surface of the mandrel made of a fluororesin. However, some load may be applied to help the shape of the mandrel to return near the initial shape. In particular, the mandrel made of a fluororesin may be allowed to stand upright or may be suspended in an oven.

As described above, the deformation (strain) of the mandrel made of a fluororesin generated in the molding step can be removed by heating the mandrel under substantially unloaded conditions to a temperature above the temperature at which the fluororesin is crystallized. Even if the mandrel made of a fluororesin has undergone a considerably serious deformation, the deformation can be removed so as to recover the initial shape retentiveness by effecting the above-described heating for a sufficient period of time. As to particular conditions, in the case of a mandrel made of PTFE, it is preferred that the heating be conducted at a temperature of from 380° to 400° C. for a period of from 30 to 120 min.

After the removal of the deformation of the mandrel made of a fluororesin in the heating step, the mandrel is sent to the step of gradual cooling. This step serves to convert the fluororesin which has been rendered amorphous in the heating step into a crystal and increase the effect of promoting crystal growth. As a result, it is possible to return the elasticity retentiveness of the mandrel made of a fluororesin to the initial state.

The cooling must be effected gradually. The gradual cooling effects uniform cooling, without causing temperature distribution, of the whole of the mandrel made of a fluororesin which has been subjected to the heat treatment, so that the similitude of the shape is maintained between the mandrel prior to the heat treatment and that after the heat treatment. For example, when the cooling of a cylindrical mandrel is not gradual, acute parts are first solidified so that the mandrel is deformed to assume an hourglass form. Such a deformation can be prevented by gradual cooling.

The gradual cooling conditions are preferably chosen so as to maximize the elasticity of the mandrel. When the cooling rate is too low, not only the heat treatment takes too long a time but also the above-described effect of promoting crystal growth is increased too much, so that spherulites having a large particle size are formed to thereby cause the mandrel made of a fluororesin to become readily tearable. On the other hand, when this rate is too high, it is impossible to increase the elasticity retentiveness sufficiently. Therefore, it is preferred that the gradual cooling rate range from 1° to 10° C./min. Especially, in the case of a mandrel made of PTFE, the optimum cooling rate is about 2° C./min.

The gradual cooling is effected to at least a temperature below the temperature at which the fluororesin is crystallized. It is preferred that the gradual cooling be conducted to a temperature which is at least 50° C. below the crystallization temperature. In the case of a mandrel made of PTFE, it is preferred that the mandrel be gradually cooled to 250° C. and then allowed to cool in a room-temperature atmosphere. Although it is desirable to allow the mandrel to cool in a room-temperature atmosphere as mentioned hereinabove, the gradual cooling may be followed by quenching with water or the like, when it is necessary to urgently regenerate a used mandrel made of a fluororesin, as long as the gradual cooling has been conducted to 250° C.

The FRP for forming a hollow product to be molded by the molding method in which the mandrel according to the present invention is used is mainly a fiber-reinforced plastic comprising a thermoplastic resin as a matrix, and various known FRPs can be used therefor. Representative examples of the reinforcing fibers for the FRP include carbon, glass, silicon nitride, boron and alumina fibers, among which carbon fiber is most desirable. Examples of the matrix resins which may be mentioned include thermoplastic resins, such as polyethyer etherketone and polytetramethylene terephthalate, and B-stage thermoplastic epoxy resin compositions.

An FRP pipe made of a polyether etherketone and carbon fibers and having an outer diameter of 32 mm and an inner diameter of 30 mm was produced using a mandrel made of PTFE and having an outer diameter of 28 mm, an inner diameter of 13 mm and a length of 100 mm. The inner diameter of the hollow preform of the molding material was adjusted to 28.5 to 29 mm.

The mandrel thus used once was allowed to stand in an oven at 380° C. for 30 min, cooled to 250° C. at a gradual cooling rate of −2° C./min, and allowed to stand in a room-temperature atmosphere, thereby effecting regeneration. The regenerated mandrel recovered the size of the initial mandrel.

The above-described molding of an FRP pipe was repeated using this regenerated mandrel, and thus cycle of the regeneration of the mandrel and the molding of the FRP pipe was repeated again and again. As a result, good pipes were molded up to the 30-th cycle, but in the 31st cycle, the mandrel suffered from cracks. The sum of molded pipes was 31 including one molded using the initial mandrel.

By contrast, the molding of the FRP pipes was repeated without regenerating the above-described once used mandrel. In the first molding run, an increase in bulging was observed at each edge of the mandrel, so that the bulge had to be shaven off prior to each molding run so as to permit the insertion of the mandrel into the preform. Further, in the third molding run conducted after shaving off the bulge at the edge, the clamping function did not work well, so that it was impossible to satisfactorily press the FRP preform against the outer die, thus failing in producing good molded products. As a result, it was found that the mandrel could be reused at most only twice. The sum of molded pipes having an acceptable quality was 3 including one produced using the initial mandrel.

What is claimed is:

1. A method for regenerating a mandrel made of a thermally expandable fluororesin, which comprises the step of heating a used mandrel made of a fluororesin under substantially unloaded conditions to a temperature above the temperature at which the fluororesin is crystallized and gradually cooling said mandrel to a temperature below the temperature at which the fluororesin is crystallized.

2. The method for regenerating a mandrel made of a thermally expandable fluororesin according to claim 1, wherein heating in said heating step is conducted at a temperature which is above the temperature at which the fluororesin is crystallized but below the temperature at which the fluororesin is decomposed.

3. The method for regenerating a mandrel made of a fluororesin capable of thermal expansion according to claim 1, wherein gradual cooling in said gradual cooling step is conducted at a cooling rate of from 1° to 10° C./min to a temperature which is at least 50° C. below the temperature at which the fluororesin is crystallized.

4. The method for regenerating a mandrel made of a thermally expandable fluororesin according to claim 3, wherein gradual cooling in said gradual cooling step comprises cooling the mandrel to a temperature of 250° C. and leaving it to cool in a room-temperature atmosphere.

5. The method for regenerating a mandrel made of a thermally expandable fluororesin according to claim 1, wherein said fluororesin is a member selected from the group consisting of polytetrafluoroethylene, hexafluoropropylene-tetrafluoroethylene copolymer and polychlorotrifluoroethylene.

6. The method for regenerating a mandrel made of a thermally expandable fluororesin according to claim 1, wherein said fluororesin is a polytetrafluoroethylene, and heating in said heating step is conducted at a temperature of from 380° to 400° C. for a period of from 30 to 120 min.

7. The method for regenerating a mandrel made of a thermally expandable fluororesin according to claim 1, wherein said mandrel is shaped in cylindrical form.

8. A method of molding a plurality of fiber reinforced plastic products in succession using a single mandrel, comprising steps of
 (a) placing a hollow preform made of a fiber reinforced plastic molding material in an outer die,
 (b) inserting a mandrel made of thermally expandable fluororesin into the hollow part of the preform,
 (c) heating the whole to cause thermal expansion of the mandrel, thereby clamping the preform between the mandrel and the outer die to form a fiber reinforced plastic product,
 (d) rapidly cooling the whole to solidify the preform thus treated and shrink the mandrel,
 (e) withdrawing the shrunk mandrel,
 (f) removing the fiber reinforced plastic product from the outer die,
 (g) heating the shrunk mandrel under substantially unloaded conditions to a temperature above the temperature at which the fluororesin is crystallized,
 (h) gradually cooling the heated mandrel to a temperature below the temperature at which the fluororesin is crystallized, and
 (i) repeating steps (a) through (h) using the same mandrel used in steps (a) through (h) and a new hollow preform for each repetition.

* * * * *